June 11, 1940.    H. ROMANSKI    2,204,382
REFRIGERATION
Filed May 20, 1937    2 Sheets-Sheet 1

Inventor
Henry Romanski
By L. F. Randolph
Attorney

June 11, 1940.  H. ROMANSKI  2,204,382
REFRIGERATION
Filed May 20, 1937  2 Sheets-Sheet 2

Inventor
Henry Romanski
By L. F. Randolph
Attorney

Patented June 11, 1940

2,204,382

UNITED STATES PATENT OFFICE 2,204,382

REFRIGERATION

Henry Romanski, New Orleans, La.

Application May 20, 1937, Serial No. 143,794

1 Claim. (Cl. 62—173)

This invention relates to refrigeration and to a method or process and means applicable to all automatic refrigerators and all commercial ice cream machines in order to produce non-crystallized ice cream through the operation of such refrigerators and machines, in combination with automatic controls to regulate the actuation of the container and agitator employed for the ice cream, depending upon the condition of the latter.

It is further aimed to provide structures to practice my method wherein the motor will not be overtaxed, will work effectively without attention, day and night, and will provide ice cream of the desired consistency and richer and more tasteful in flavor, it being understood that the invention is not limited to any one construction.

Figure 1:
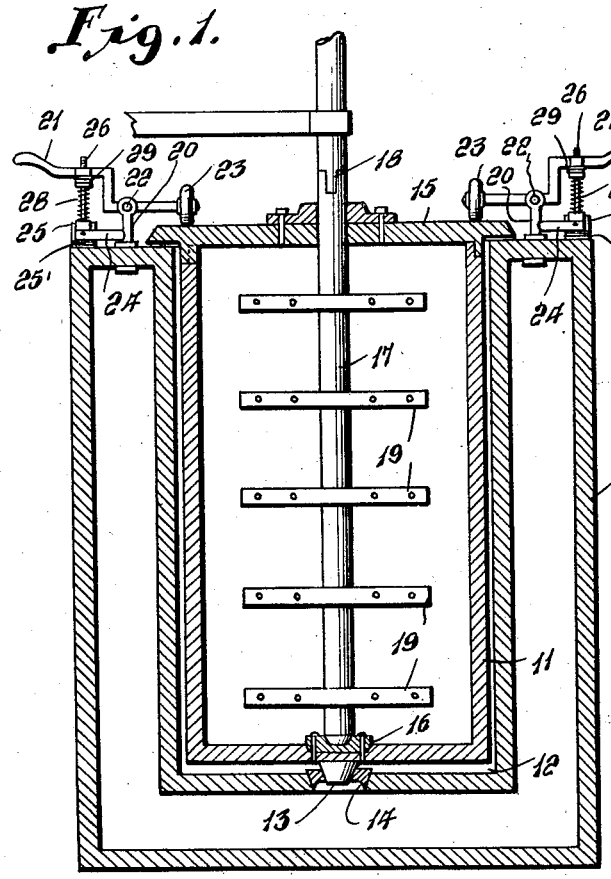
Figure 1 is a vertical sectional view illustrating the invention as practiced in connection with refrigeration means of the paddle type with a mechanical automatic arrangement.
Figure 3:
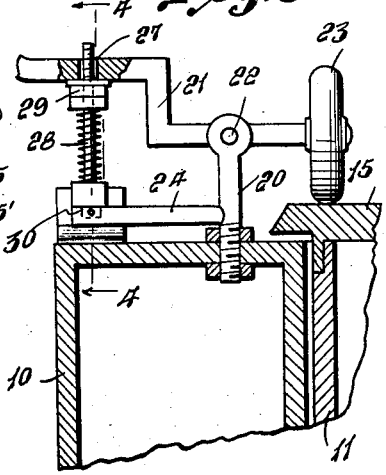
Figure 3 is an enlarged vertical sectional view taken on the same plane as Figure 1 detailing one of the control devices.
Figure 4:
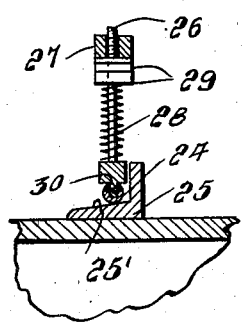
Figure 4 is a side view, partly in section, taken substantially on the line 4—4 of Figure 3.
Figure 2:
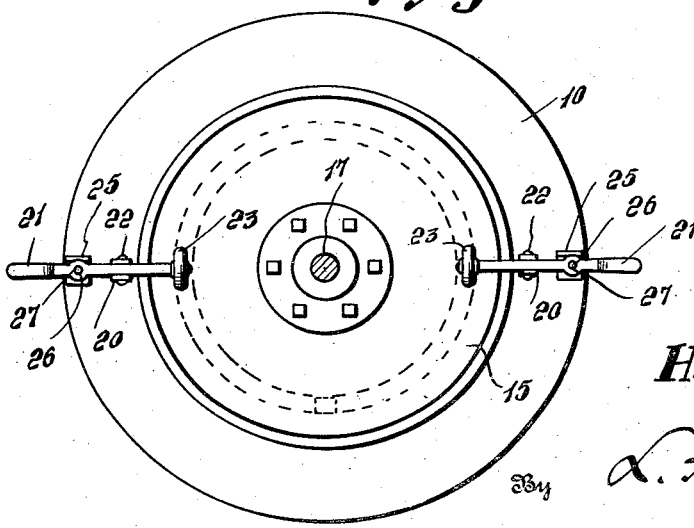
Figure 2 is a plan view of the parts of Figure 1.

Referring specifically to the drawings wherein like reference characters designate like or similar parts, and the various forms are illustrated and described by way of example only, for practicing my new method, and first to the Figures 1 to 4, numeral 10 designates a refrigerator unit in which a container 11 is removably disposed and which container is adapted to hold the materials necessary for making ice cream. The term "ice cream" is used in its broadest sense so as to include any frozen confection, dessert or the like capable of manufacture in an ice cream freezer or the equivalent. Such container 11 is disposed in a well 12 and at its bottom carries a center stud 13 journaled in a bearing 14 carried by the unit.

The container 11 has a cover plate 15 detachably secured thereon and journaled through the latter and in a socket 16 in the base of the container, is a shaft 17 in detachable and displaceable sections connected together by coupling means as at 18 and which shaft within the container has paddle members 19 thereon. To prevent the cover from moving sideways there is a slot in the cover to fit a corresponding projection of the container. The shaft 17 is adapted to be rotated from any suitable source of power in order to operate the paddles to churn ice cream.

The studs 20 rise from the refrigerating unit 10 and have levers 21 pivoted thereto at 22 on which friction rollers 23 are mounted, capable of rotating and disposed in frictional contact with the upper surface of the cover 15.

Arms 24 extend from the studs 20 and rest on shoes 25 secured to the upper surface of the unit 10. Rods 26 rise from the arms 24 in line with the shoes 25 and extend through openings 27 in the levers 21. Expansive coil springs 28 surround the rods 26 and nuts 29 are screw threaded on the rods so as to vary the tension of the springs 28 and regulate the tension at which the rollers 23 engage the cover 15. The lower ends of the rods 26 are removably disposed or swiveled in socket members 30, directly connected to the rods 24.

As a result of the construction described, the rollers 23 normally maintain the container 11 and its cover against movement relatively to the refrigerating unit 10 so that the shaft 17 and paddle members 19 may be operated, that is, rotated, to churn ice cream. The shaft 17 is continuously rotated in one direction from any suitable source of power as for instance that of the refrigerating unit for automatically refrigerating the unit 10, it being understood however, that the refrigeration unit 10 is refrigerated in the known manner, preferably automatically, and that my invention is supplemental thereto.

The degree of friction of rollers 23 against the cover 15 is regulated through the tension of the springs 28 so as to normally hold the container 11 immovable relatively to the unit 10 so that when the ice cream is soft, the shaft 17 will turn within the container 11 and churn ice cream. However, when the ice cream is sufficiently hard or of the predetermined consistency, the shaft and its paddle members will turn unitarily with the ice cream and the container 11, the latter overcoming the friction at the rollers 23, and the entire ice cream container rotating on bearing 13.

Thus when the ice cream is sufficiently hard, the container 11 and its contents and shaft 17 will all rotate as a unit, but should the ice cream soften within the container 11, the wheels 23 through the frictional engagement with the cover of the container will again hold the container fixed relative to the unit and permit independent operation of the shaft 17 and paddle members 19 within the ice cream and relatively to the container 11, restoring the ice cream to the desired consistency or hardness, whereupon the container and contents will overcome the friction at the rollers 23 and rotate unitarily with the shaft 17, this action occurring automatically as the ice cream softens and hardens from time to time.

Ice cream may be readily removed since the cover 15 is removable after swinging levers 21 on the studs 20, which latter are roatably connected to the unit 10 and are disengageable from the shoes 25. It will be noted that portions of the shoes 25 afford cam surfaces at 25', so that when the arms 24 engage the same a more secure and tighter displaccable connection is afforded. After disengagement of the cover 15, the lower shaft section 17 is disengaged at the socket 16 and joint 18, the portion of shaft 17 above the joint preferably including a flexible portion, or an upwardly slidable and displaceable portion.

The cover 15 is removable from the lower section of the shaft 17.

The foregoing description has been specific only since it is required by law and not because the practice of my invention is limited thereto, as it may be practiced in many ways.

Figure 5:
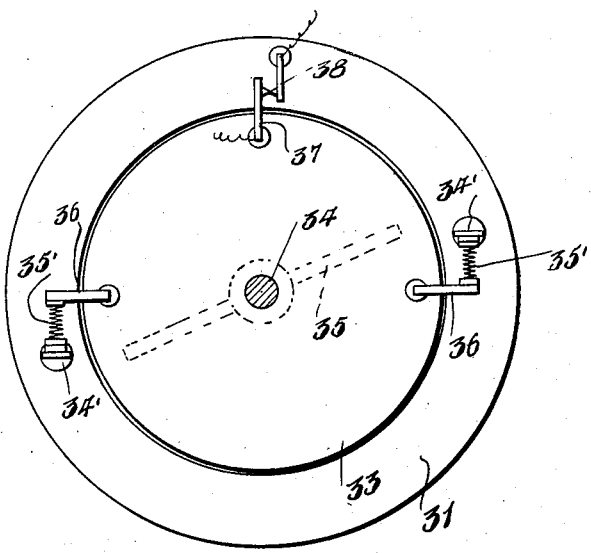
Figure 5 is a plan view of a modified form of the same paddle type arrangement having electrically controlled automatic features.
Figure 6:
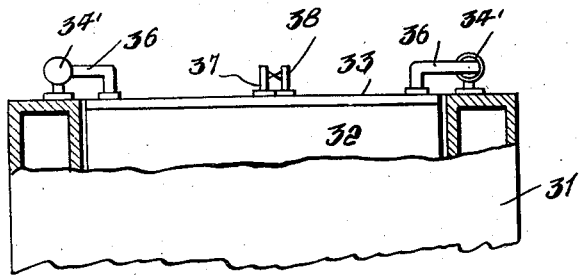
Figure 6 is a substantially diametric-vertical sectional view through the form of Figure 5.

Another entire electrical embodiment capable of practicing the new method of the invention is disclosed in Figures 5 and 6. Here the refrigerating unit is the same as in the form of Figure 1 and designated 31 in which a removable ice cream container 32 of conventional form, is disposed, having a removable cover 33, and a rotatable shaft 34 passing removably therethrough and equipped with paddle members 35. Arms 36 are rigidly connected to the cover 33 and project over the unit 31 in line with abutments 34' on the unit, with relatively strong expansive coil springs 35' connected to and disposed intermediate the arms 36 and abutments 34. Contact members 37 and 38 are carried by the cover 33 and unit 31 arranged in an outside electric circuit which is adapted to rotate the shaft 34.

Presuming operation of the suggested structure of Figures 5 and 6, when the ice cream is soft, the shaft 34 is rotated by the source of power, operating the paddle members 35 and churning the ice cream, with the container 32 and its cover 33 remaining stationary. However at this time, the contacts 37 and 38 will be engaged closing the circuit to the source of power. When the ice cream in the container 32 reaches the desired consistency or hardness, the shaft 34, the ice cream and the cover 33 have a slight unitary movement within and relative to the refrigerating unit 31, such movement being against the action of the springs 35', on bearing 13 thereby tensioning such springs and opening the contacts at 37 and 38.

The parts will remain in this position due to the hardness of the ice cream, with the circuit broken and the springs 35' tensioned, until the ice cream in container 32 softens, whereupon the tension of the springs 35' rotates the container 32, back to the position of engagement of contacts 37 and 38, because the softer ice cream will permit such rotation thus automatically reestablishing the circuit for operating the shaft 34 to again churn the ice cream to the desired consistency. Such action occurs automatically without attention.

I claim as my invention:

The method of converting an edible mass into a frozen confection; said method comprising securing a container in heat exchange relation with and in fixed relation with an evaporator of a refrigerating system of the compressor, condenser, expander type; confining said mass within said container; simultaneously driving an agitation means through the mass through power derived from the prime mover of the compressor and absorbing heat from said mass by operation of the evaporator; and utilizing the mass after the latter becomes frozen to release the container from said fixed relation and cause it to partake of the motion of the agitation means and thereby obviate a drag upon the prime mover due to movement of the agitating means through the frozen mass.

HENRY ROMANSKI.